United States Patent
Kim et al.

(10) Patent No.: US 11,393,255 B2
(45) Date of Patent: Jul. 19, 2022

(54) LIVENESS DETERMINING METHOD AND APPARATUS AND METHOD AND APPARATUS FOR TRAINING THE LIVENESS DETERMINING APPARATUS

(71) Applicant: SAMSUNG ELECTRONICS CO., LTD., Suwon-si (KR)

(72) Inventors: Joohyeon Kim, Seoul (KR); Younkyu Lee, Seoul (KR); Jingu Heo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 58 days.

(21) Appl. No.: 17/015,915

(22) Filed: Sep. 9, 2020

(65) Prior Publication Data

US 2021/0182583 A1 Jun. 17, 2021

(30) Foreign Application Priority Data

Dec. 16, 2019 (KR) ........................ 10-2019-0167812

(51) Int. Cl.
*G06V 40/40* (2022.01)
*G06K 9/62* (2022.01)
*G06V 40/12* (2022.01)

(52) U.S. Cl.
CPC .......... *G06V 40/45* (2022.01); *G06K 9/6223* (2013.01); *G06K 9/6227* (2013.01); *G06K 9/6256* (2013.01); *G06V 40/1388* (2022.01); *G06V 40/1394* (2022.01)

(58) Field of Classification Search
CPC . G06K 9/00107–0012; G06K 9/00906; G06K 9/6223; G06K 9/6227; G06K 9/6256; G06V 40/45; G06V 40/1388; G06V 40/1394
See application file for complete search history.

(56) References Cited

U.S. PATENT DOCUMENTS

| 9,202,099 B2 | 12/2015 | Han et al. |
| 9,519,821 B2 | 12/2016 | Sahin et al. |
| 10,068,124 B2 | 9/2018 | Bonev |
| 10,127,429 B2 | 11/2018 | Krishnapura et al. |

(Continued)

FOREIGN PATENT DOCUMENTS

| CN | 109063572 A | * 12/2018 |
| KR | 10-2005-0079620 A | 8/2005 |

(Continued)

*Primary Examiner* — Casey L Kretzer
(74) *Attorney, Agent, or Firm* — Sughrue Mion, PLLC (57) ABSTRACT

Disclosed are a liveness determining method and apparatus and a method and apparatus for training the liveness determining apparatus. The liveness determining method includes extracting, by a processor, a feature from an input fingerprint image, inputting the feature into the current layer classifier, inputting the feature into the subsequent layer classifier, based on a determination that an output of the current layer classifier is live, and determining a liveness of the input fingerprint image to be false, based on a determination that an output of the subsequent layer classifier is fake, wherein the current layer classifier and the subsequent layer classifier are respectively trained based on a plurality of training fake images belonging to different groups.

15 Claims, 6 Drawing Sheets

(56) References Cited

U.S. PATENT DOCUMENTS

| | | | | |
|---|---|---|---|---|
| 2013/0322740 | A1* | 12/2013 | Chen | G06K 9/6219 |
| | | | | 382/159 |
| 2014/0294262 | A1* | 10/2014 | Schuckers | G06K 9/00073 |
| | | | | 382/125 |
| 2016/0300343 | A1* | 10/2016 | Gazit | G16H 50/50 |
| 2018/0129858 | A1 | 5/2018 | Russo | |
| 2020/0193332 | A1* | 6/2020 | Zhang | G06F 16/285 |

FOREIGN PATENT DOCUMENTS

| | | |
|---|---|---|
| KR | 10-2008-0029218 A | 4/2008 |
| KR | 10-2017-0112302 A | 10/2017 |
| KR | 10-2018-0069964 A | 6/2018 |
| KR | 10-2019-0046679 A | 5/2019 |

\* cited by examiner

LIVENESS DETERMINING METHOD AND APPARATUS AND METHOD AND APPARATUS FOR TRAINING THE LIVENESS DETERMINING APPARATUS

CROSS-REFERENCE TO RELATED APPLICATION

This application is based on and claims priority from Korean Patent Application No. 10-2019-0167812, filed on Dec. 16, 2019 in the Korean Intellectual Property Office, the disclosure of which is incorporated herein by reference in its entirety.

BACKGROUND

1. Field

Methods and apparatuses consistent with exemplary embodiments relate to verification technology. More particularly, exemplary embodiments relate to technology for determining a liveness during a user verification process.

2. Description of the Related Art

In a user verification system, a computing device determines whether to allow a user to access the computing device based on verification information provided by the user. The verification information includes a password input by the user or biometric information of the user.

Recently, there has been a growing interest in anti-fake fingerprint technology to improve security in the user verification system. The anti-fake fingerprint technology includes apparatus and methods that determine whether a fingerprint of a user input into a computing device is a fake fingerprint or a genuine fingerprint. In order to make this determination, features are extracted from an input image, and a determination is made as to whether the input fingerprint is a fake fingerprint based on the extracted features. The fake fingerprint may be formed of various materials. In fingerprint verification systems, it is important to identify such biometric mimicking to improve security.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of the disclosure, there is provided a method of training a liveness determining apparatus, the method comprising: clustering, by a processor, a plurality of training fake fingerprint images into a plurality of groups, each of the plurality of groups including one or more training fake finger print images among the plurality of training fake fingerprint images; training, by the processor, one or more layer classifiers respectively using different groups among the plurality of groups; and generating, by the processor, an overall classifier by combining the trained one or more layer classifiers.

The clustering the plurality of training fake fingerprint images into the plurality of groups may comprise: extracting an N-dimensional histogram corresponding to intensities of each of the plurality of training fake fingerprint images; and clustering the plurality of training fake fingerprint images into the plurality of groups based on the extracted N-dimensional histogram.

A feature input into the one or more layer classifiers may be a multi-scale feature.

The generating the overall classifier may comprise: determining one or more difficulty levels of liveness determination with respect to the plurality of groups; and generating the overall classifier by combining the one or more layer classifiers based on the one or more difficulty levels.

The clustering the plurality of training fake fingerprint images into the plurality of groups may comprise clustering a plurality of true fingerprint images together with the plurality of training fake fingerprint images, and the determining the one or more difficulty levels may comprise determining the difficulty levels each based on a proportion of the number of training true fingerprint images to the number of training fake fingerprint images included in each of the plurality of groups.

The determining the one or more difficulty levels may comprise determining each difficulty level to be relatively high if the proportion is relatively high.

The generating the overall classifier may comprise combining the one or more layer classifiers in an order from a layer classifier of a first difficulty level to a layer classifier of a second difficulty level, the first difficulty level being lower than the second difficulty level.

According to another aspect of the disclosure, there is provided a liveness determining method using a liveness determining apparatus that includes an overall classifier having a current layer classifier and a subsequent layer classifier, the liveness determining method comprising: extracting, by a processor, a feature from an input fingerprint image; inputting, by the processor, the feature into the current layer classifier; inputting, by the processor, the feature into the subsequent layer classifier based on a determination that an output of the current layer classifier is live; and determining, by the processor, a liveness of the input fingerprint image to be false based on a determination that an output of the subsequent layer classifier is fake, wherein the current layer classifier and the subsequent layer classifier are respectively trained based on a plurality of training fake images belonging to different groups.

The method may further comprise determining the liveness of the input fingerprint image to be false, based on a determination that the output of the current layer classifier or the output of the subsequent layer classifier is fake.

The method may further comprise extracting an N-dimensional histogram corresponding to intensities of the plurality of training fake fingerprint images, and clustering the plurality of training fake fingerprint images into the different groups based on the extracted N-dimensional histogram.

The method may further comprise updating a parameter of the overall classifier based on multi-scale features of a plurality of first training fake fingerprint images belonging to a first group, among the different groups.

The method may further comprise clustering the plurality of training fake fingerprint images together with a plurality of true fingerprint images into the different groups, and combining the current layer classifier and the subsequent layer classifier based on a level of difficulty of liveness determination of each of the different groups to form the overall classifier.

The level of difficulty of liveness determination of each of the different groups may be determined based on a proportion of the number of training true fingerprint images to the number of training fake fingerprint images belonging to each of the different groups.

The current layer classifier may be trained using a first group of training fake images from the plurality of training fake images having a first difficulty level, and the subsequent layer classifier is trained using a second group training fake images from the plurality of training fake images having a second difficulty level, the first difficulty level being lower than the second difficulty level.

According to another aspect of the disclosure, there is provided a non-transitory computer-readable storage medium storing instructions that, when executed by a processor, cause the processor to perform a method comprising: clustering, by a processor, a plurality of training fake fingerprint images into a plurality of groups, each of the plurality of groups including one or more training fake finger print images among the plurality of training fake fingerprint images; training, by the processor, one or more layer classifiers respectively using different groups among the plurality of groups; and generating, by the processor, an overall classifier by combining the trained one or more layer classifiers.

According to another aspect of the disclosure, there is provided a liveness determining apparatus, comprising: a memory configured to store an overall classifier comprising a current layer classifier and a subsequent layer classifier; and at least one processor configured to: extract a feature from an input fingerprint image, input the feature into the current layer classifier, input the feature into the subsequent layer classifier based on a determination that an output of the current layer classifier is live, and determine a liveness of the input fingerprint image to be false based on a determination that an output of the subsequent layer classifier is fake, wherein the current layer classifier and the subsequent layer classifier are respectively trained based on a plurality of training fake images belonging to different groups.

BRIEF DESCRIPTION OF THE DRAWINGS

The above and/or other aspects will be more apparent by describing certain exemplary embodiments with reference to the accompanying drawings, in which.

DETAILED DESCRIPTION

The following detailed structural or functional description is provided as an example only and various alterations and modifications may be made to the exemplary embodiments. Accordingly, the exemplary embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Meanwhile, in some alternative implementations, functions or operations specified in predetermined blocks may be performed in an order different from that shown in a flowchart. For example, two successive blocks may be performed substantially concurrently in practice or may be performed in a reverse order depending upon the related functions or operations.

Hereinafter, exemplary embodiments will be described in detail with reference to the accompanying drawings. Like reference numerals in the drawings denote like elements, and thus their description will be omitted.

Figure 1:
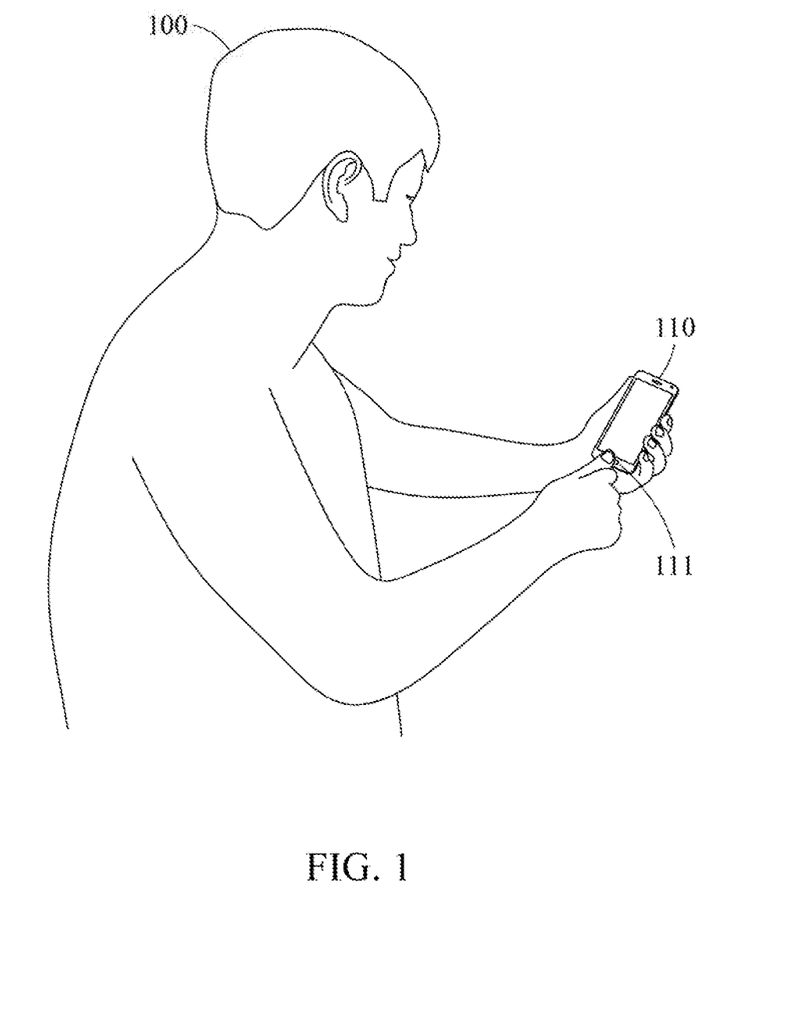
FIG. 1 illustrates a situation in which fingerprint verification is performed through a liveness determining apparatus according to an exemplary embodiment.

FIG. 1 illustrates a situation in which fingerprint verification is performed through a liveness determining apparatus according to an exemplary embodiment.

A fingerprint is one of the parameters that is most widely used for biometric verification. For instance, the fingerprint is widely used in numerous environments, ranging from user verification on mobile devices to identification at crime scenes. Recently, with the active use of internet backing in a mobile environment, a user verification method utilizing a fingerprint is used a lot. Moreover, biometric verification may generally include a liveness test operation and a verification operation.

A liveness test refers to a process of examining whether an object being a test subject is an animate object, for example, examining whether a fingerprint shown in an image captured by a camera is a true fingerprint or a fake fingerprint. The liveness test may be used to examine a liveness of a verification subject (the same as the test subject) in relation to user verification performed for a user log-in, a payment service, or an access control. For example, the liveness test is used by a user verification system to distinguish between an inanimate object (for example, a photo, paper, an image, or a model used as a spoofing means) and an animate object (for example, a living person).

An invalid or an unauthorized user may attempt to induce a false acceptance of the user verification system using spoofing techniques. For example, in fingerprint verification, the invalid user may present, to a camera, a color image or video including a fingerprint of a valid user, or a model mimicking a fingerprint shape of a valid user to induce a false acceptance. The liveness test prevents a false acceptance by filtering such verification attempts (in other words, spoofing attacks) which use a substituent such as a photo, a movie, a mask, or a model. If the verification subject is determined to be an inanimate object as a result of the liveness test, it may not move to a user verification operation, or it may be determined that a user verification is failed finally irrespective of the result of the user verification.

A liveness determining apparatus 110 may verify a user 100 based on an input fingerprint image of the user 100 input through an input interface 111. The liveness determining apparatus 110 may determine a liveness of the input fingerprint image of the user 100 and then verify the input fingerprint image. The liveness determining apparatus 110 may determine the liveness of the input fingerprint image using a classifier configured based on a neural network.

The liveness determining apparatus may reduce a cost by using an optical sensor that is cheaper than a capacitive sensor and an ultrasonic sensor.

The classifier included in the liveness determining apparatus 110 may be trained in advance using training data. The liveness determining apparatus 110 may be trained to more accurately distinguish a fake fingerprint image and a true fingerprint image. The liveness determining apparatus 110 may derive a training result with a high-level accuracy using a small quantity of data by clustering training fake fingerprint images included in the training data. The liveness determining apparatus may maintain a relatively high accuracy of liveness determination while using a smaller quantity of training data through clustering during a training process.

Operations of the liveness determining apparatus include a training process and a verification process.

A training apparatus may train the classifier of the liveness determining apparatus 110 with the training data. The training apparatus may be the liveness determining apparatus 110, or an apparatus separate from the liveness determining apparatus 110. For example, the classifier may be trained by the separate training apparatus, and the trained classifier may be embedded in the liveness determining apparatus 110. As another example, the liveness determining apparatus 110 may autonomously train the classifier with the training data and store a final result.

During the training process, a plurality of training fake fingerprint images and a plurality of training true fingerprint images may be used as the training data. Here, the training fake fingerprint images are fake fingerprint images used as training data, and the training true fingerprint images are true fingerprint images used as training data.

The training apparatus may cluster the plurality of training fake fingerprint images. Here, clustering may be referred to as grouping. The training apparatus may cluster the plurality of training fake fingerprint images into a plurality of groups each having similar characteristics. A fake fingerprint may be implemented in various forms. For example, fake fingerprints that use various materials such as paper, silicone, gelatin, and wood glue may be used. A fake fingerprint image may include a unique characteristic, which is not only related to a material characteristic but also (or instead) may be related to an environment characteristic at that time when the image is generated. The environment characteristic may include, for example, low temperature, external light, or a dry environment. Results of the clustering may be classified by similar attributes based on used materials and environments. The training apparatus may cluster images having similar characteristics in terms of material and environment into the same group. As described above, by grouping and training the training fake fingerprint images by types, the same accuracy may be achieved through less database when compared to that achieved when more database is used.

For example, the training apparatus may cluster the training fake fingerprint images using k-means clustering. The training apparatus may extract a 256-dimensional histogram about intensities of the training fake fingerprint images and perform clustering. When fake fingerprint images of similar patterns are grouped, the grouped fake fingerprint images may be reclassified based on difficulty levels of classification, and a result of the reclassification may be used to train the classifier.

The training apparatus may train the neural network-based classifier. The training apparatus may train one or more layer classifiers based on the clustered groups. Here, the layer classifiers may be classifiers constituting an overall classifier. The overall classifier may be a classifier configured to determine a final liveness of the input fingerprint image.

The training apparatus may train a single layer classifier using a single group. The training apparatus may train a single layer classifier using a plurality of similar groups. The training apparatus may train different layer classifiers using different groups. The training apparatus may train the layer classifiers by sharing the remaining groups among the plurality of layer classifiers while assigning a unit group to a single layer classifier. In this example, since a predetermined group is unique to each layer classifier, the layer classifiers may derive a training result that exhibits a relatively high accuracy and is more flexible due to the remaining shared groups, while well reflecting a characteristic of the group.

The layer classifiers trained as described above may be sensitive to a material characteristic, an environment characteristic or combination of a material characteristic and an environment characteristic. The material characteristic and/or the environment characteristic may be predetermined. For example, the trained layer classifiers may be sensitive to images of fake fingerprints that use silicone material, the images captured under dim lighting. For example, the trained layer classifiers may be sensitive to images of fake fingerprints that use rubber material, the images captured under bright lighting.

The respective groups may differ in terms of the difficulty level of liveness determination. A difference between features of training fake fingerprint images and features of true fingerprint images in a single group may be great or small. The training apparatus may determine the difficulty values of the clustered groups by various standards. For example, the training apparatus may cluster the plurality of training true fingerprint images together with the plurality of training fake fingerprint images. The training apparatus may determine a difficulty level of a group based on training true fingerprint images included in the group. For example, the training apparatus may determine the difficulty level based on a proportion of the training true fingerprint images to the training fake fingerprint images of the group. If a proportion of training true fingerprint images to training fake fingerprint images of a first group is higher than a proportion of training true fingerprint images to training fake fingerprint images of a second group, a difficulty level of the first group may be determined to be higher than a difficulty level of the second group.

After training the layer classifiers about the group of the training fake fingerprint images, the training apparatus may configure the overall classifier by combining the trained layer classifiers. The overall classifier is for stepwise determination considering a difficulty level of an input fingerprint image to be verified. The training apparatus may generate the overall classifier by combining a plurality of layer classifiers. The training apparatus may combine the plurality of layer classifiers based on a difficulty level of a group used to train the plurality of layer classifiers. The training apparatus may combine the plurality of layer classifiers in an order from layer classifiers trained using a group with a relatively low difficulty level to layer classifiers trained using a group with a relatively high difficulty level. The training apparatus may generate the overall classifier by combining the layer classifiers in the form of a tree.

The liveness determining apparatus 110 may store the trained overall classifier. The liveness determining apparatus 110 may input the input fingerprint image into a layer classifier of an uppermost layer of the overall classifier. Here, the term "uppermost" is a temporal concept rather than a spatial concept and is used to refer to a layer classifier into which the input fingerprint image is first input, among the plurality of layer classifiers.

The liveness determining apparatus 110 may extract a feature from the input fingerprint image. The feature may be extracted by the liveness determining apparatus 110 using a multiscale local phase quantization (MLPQ) or a multiscale local binary pattern (MLBP) used to determine a fake fingerprint. An input of the overall classifier configured as a neural network may be feature data of the input fingerprint image, and an output thereof may be a value (float) being a real number between "0" and "1". For example, a value closer to "0" may be output for a more fake fingerprint, and a value closer to "1" may be output for a truer fingerprint.

The liveness determining apparatus 110 may determine a liveness of an input fingerprint image from features extracted using the plurality of layer classifiers. The liveness determining apparatus 110 may determine the liveness of the input fingerprint image first through a layer classifier trained using a group of a first difficulty level. Here, the liveness determining apparatus 110 may quickly determine an input fingerprint image that greatly differs from a true fingerprint image to be fake. If the input fingerprint image is determined to be live, the liveness determining apparatus 110 may determine the liveness of the input fingerprint image at a second difficulty level through a subsequent layer classifier. Here, the second difficulty level may be higher than the first difficulty level. The liveness determining apparatus 110 may more accurately determine an input fingerprint image that slightly differs from a true fingerprint image. As described above, the liveness determining apparatus 110 may determine whether an input fingerprint image is fake through the plurality of layer classifiers, and determine the input fingerprint image to be true only when all the layer classifiers determine the input fingerprint image to be live.

Figure 2:
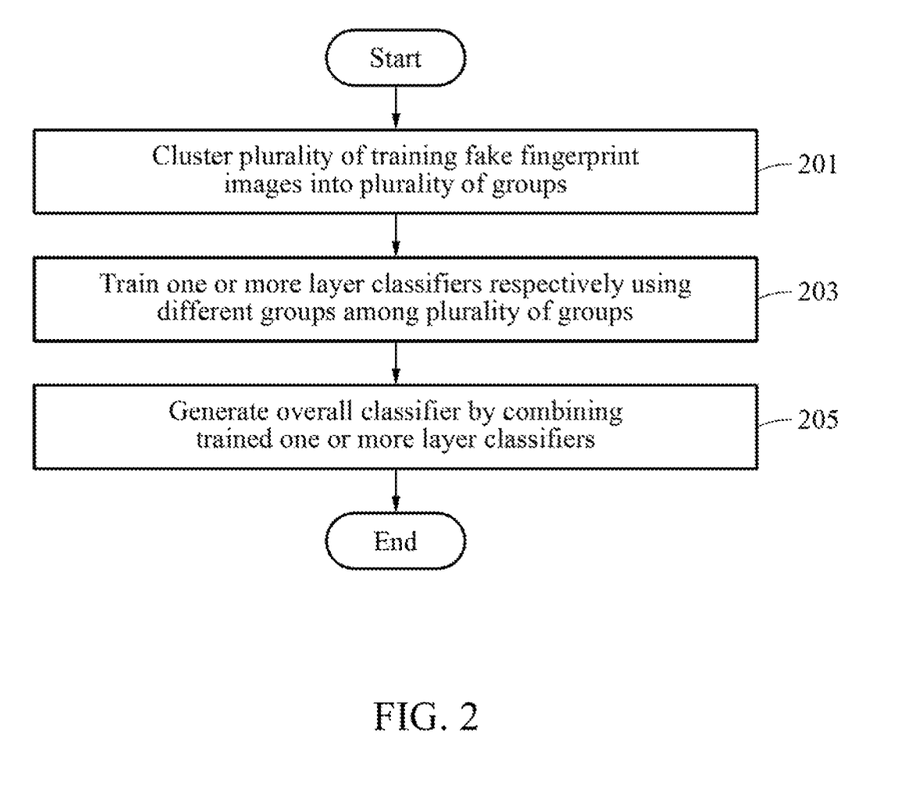
FIG. 2 is a flowchart illustrating operations of a method of training a liveness determining apparatus according to an exemplary embodiment.

FIG. 2 is a flowchart illustrating operations of a method of training a liveness determining apparatus according to an exemplary embodiment.

Referring to FIG. 2, in operation 201, a training apparatus may cluster a plurality of training fake fingerprint images into a plurality of groups. The training apparatus may extract an N-dimensional histogram with respect to intensities of the plurality of training fake fingerprint images. For example, the training apparatus may extract a 256-dimensional histogram using K-means clustering. The training apparatus may cluster the plurality of training fake fingerprint images into the plurality of groups based on the extracted histogram. The training apparatus may cluster a plurality of true fingerprint images together with the plurality of training fake fingerprint images.

In operation 203, the training apparatus may train one or more layer classifiers respectively, using different groups among the plurality of groups. The training apparatus may extract features of a plurality of training fake fingerprint images included in one of the plurality of groups. Here, the features may be multi-scale features. The training apparatus may input features of the training true fingerprint images and the features of the plurality of training fake fingerprint images into the layer classifiers. The training apparatus may adjust parameters of the layer classifiers based on outputs of the layer classifiers.

In operation 205, the training apparatus may generate an overall classifier by combining the trained one or more layer classifiers. The training apparatus may determine difficulty levels of liveness determination with respect to the plurality of groups. The training apparatus may generate the overall classifier by combining the one or more layer classifiers based on the difficulty levels. The training apparatus may determine the difficulty levels each based on a proportion of the number of training true fingerprint images to the number of training fake fingerprint images included in each of the plurality of groups. For example, the training apparatus may determine each difficulty level to be relatively high if the proportion of the number of training true fingerprint images to the number of training fake fingerprint images included in each of the plurality of groups is relatively high. The training apparatus may combine the one or more layer classifiers in an order from a layer classifier of a low difficulty level to a layer classifier of a high difficulty level.

Figure 3:
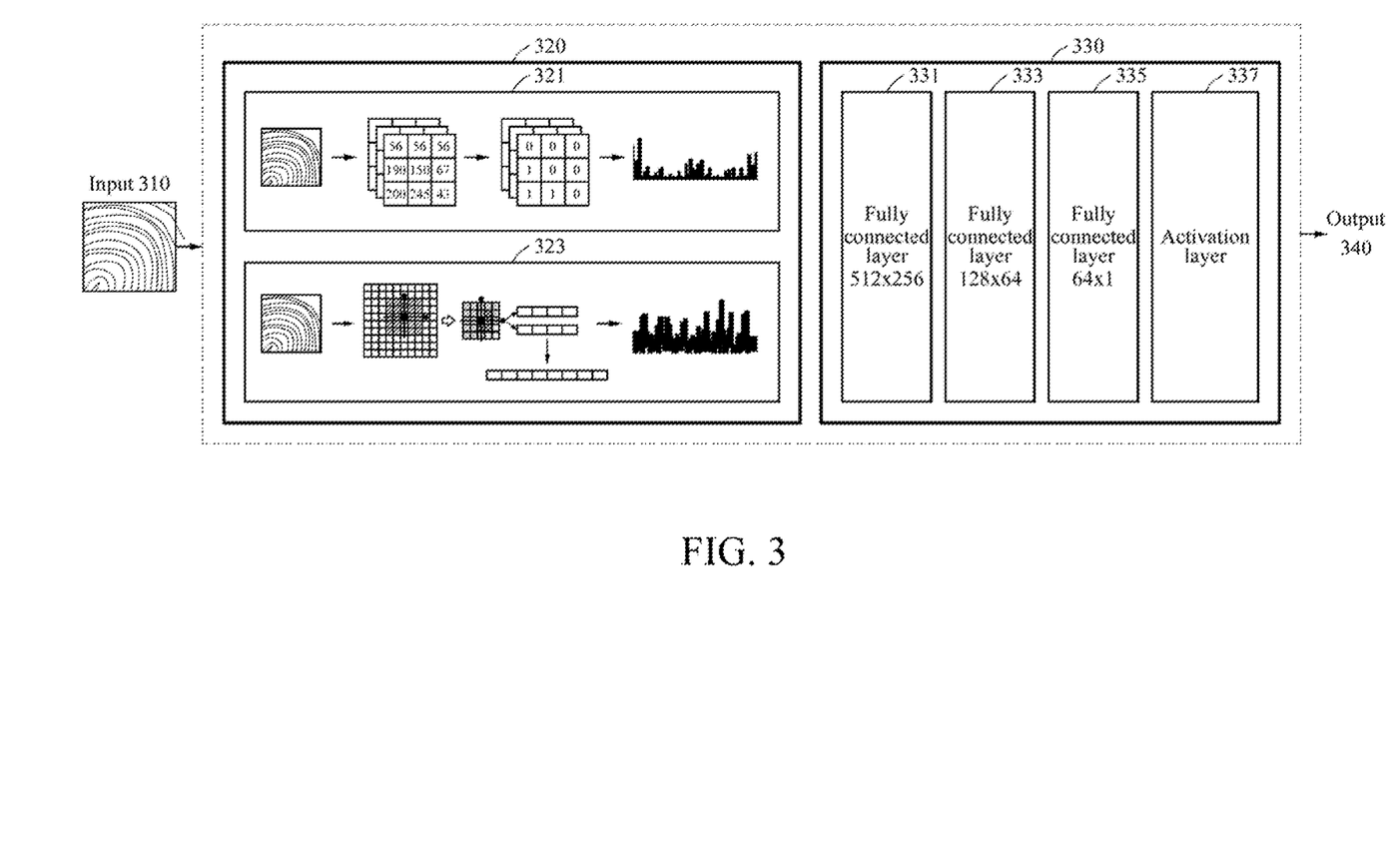
FIG. 3 illustrates a structure of a layer classifier trained using a method of training a liveness determining apparatus according to an exemplary embodiment.

FIG. 3 illustrates a structure of a layer classifier trained using a method of training a liveness determining apparatus according to an exemplary embodiment.

A training apparatus may train a classifier of a liveness determining apparatus with training data. An input 310 may be the training data and include training fake fingerprint images or training true fingerprint images in a predetermined group.

The classifier may include a feature extractor 320 and a classification unit 330. The feature extractor 320 may extract features from the input 310. The feature extractor 320 may extract multi-scale features from the input 310. The feature extractor 320 may extract, for example, an MLPQ 321 and an MLBP 323.

The classification unit 330 may receive the features of the input 310. The classification unit 330 may include one or more fully connected layers and an activation layer 337. For example, the classification unit 330 may include a 512×256 fully connected layer 331, a 128×64 fully connected layer 333, and a 64×1 fully connected layer 335. The classification unit 330 may output a value being a real number between "0" and "1", as an output 340. For example, a value closer to "0" may be output for a more fake fingerprint, and a value closer to "1" may be output for a truer fingerprint.

Figure 4:
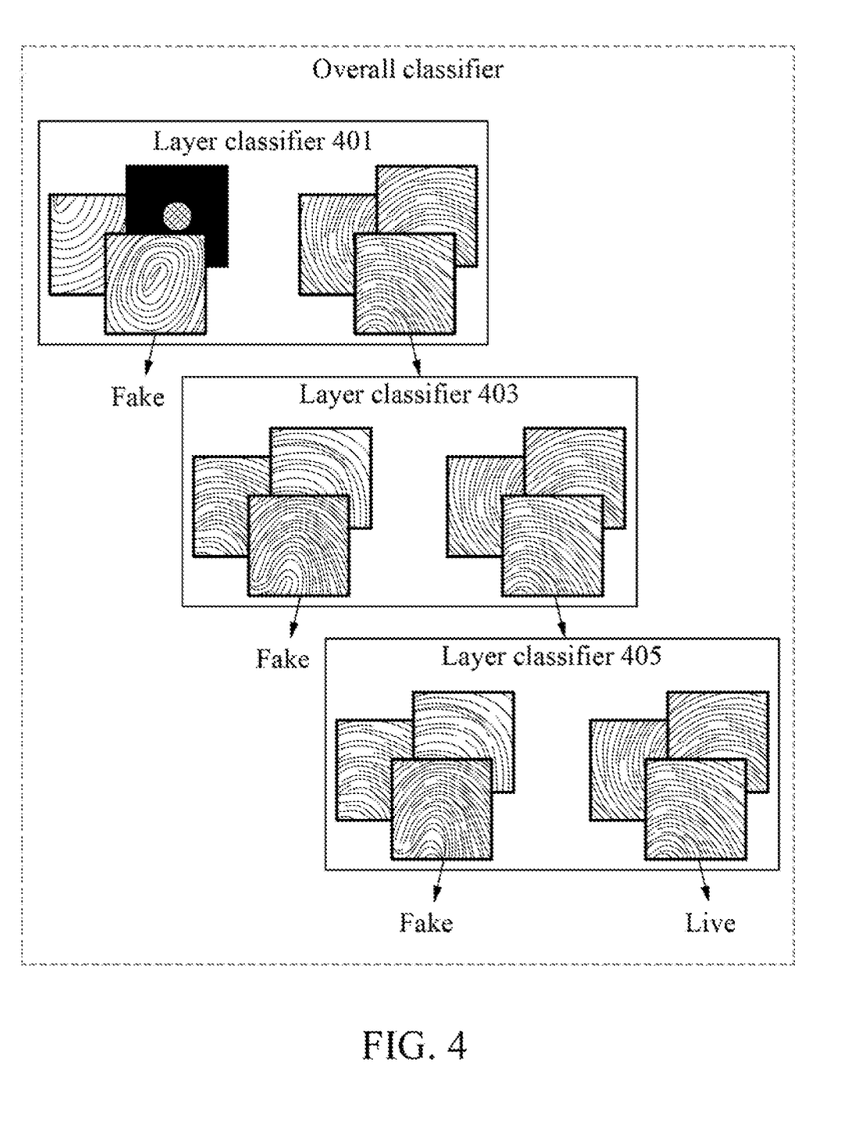
FIG. 4 illustrates a structure of an overall classifier in which classifiers trained using a method of training a liveness determining apparatus are combined according to an exemplary embodiment.

FIG. 4 illustrates a structure of an overall classifier in which classifiers trained using a method of training a liveness determining apparatus are combined according to an exemplary embodiment.

A training apparatus may combine a plurality of layer classifiers 401, 403, and 405 based on a difficulty level of a group used to train a plurality of layer classifiers. The training apparatus may combine the plurality of layer classifiers 401, 403, and 405 in an order from the layer classifier 401 trained using a group of a low difficulty level to the layer classifier 405 trained using a group of a high difficulty level. The training apparatus may generate an overall classifier by combining the layer classifiers in the form of a tree.

For example, the overall classifier may include the three layer classifiers 401, 403, and 405. In the overall classifier, the layer classifier 401 trained with training data of a relatively low difficulty level may be configured as a first layer, the layer classifier 403 trained with training data relatively similar to true fingerprint images may be configured as a second layer, and the layer classifier 405 trained with training data most similar to true fingerprint images may be configured as a third layer. A test result shows that higher accuracy and speed are achieved when a fake fingerprint is determined stepwise by the liveness determining apparatus 110 than when a fake fingerprint is not determined stepwise.

The liveness determining apparatus may determine a liveness of an input fingerprint image to be fake when any of the three layer classifiers 401, 403, and 405 outputs fake. The liveness determining apparatus may determine the liveness of the input fingerprint image to be true only when it is derived that all outputs of the three layer classifiers 401, 403, and 405 are live.

Figure 5:
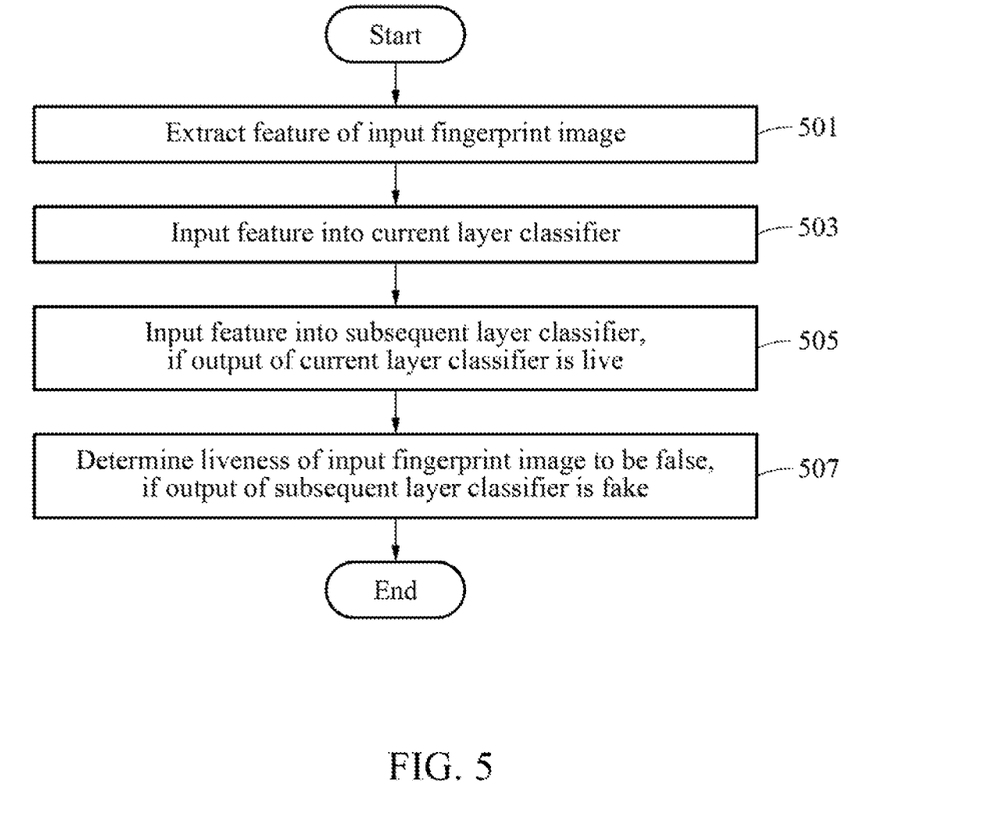
FIG. 5 is a flowchart illustrating operations of a liveness determining method according to an exemplary embodiment.

FIG. 5 is a flowchart illustrating operations of a liveness determining method according to an exemplary embodiment.

The liveness determining apparatus 110 may include an overall classifier, and the overall classifier may include a current layer classifier and a subsequent layer classifier. Here, the current layer classifier and the subsequent layer classifier are not limited to predetermined layer classifiers and may refer to layer classifiers that are successive in an order in which a feature of an input fingerprint image is input.

Referring to FIG. 5, in operation 501, the liveness determining apparatus 110 may extract a feature from an input fingerprint image. For example, the liveness determining apparatus 110 may extract a multi-scale feature. For example, the feature may include an MLPQ and an MLBP.

In operation 503, the liveness determining apparatus 110 may input the feature into a current layer classifier. Here, the current layer classifier and a subsequent layer classifier may be respectively trained based on a plurality of training fake images belonging to different groups.

During a training process, an N-dimensional histogram may be extracted with respect to intensities of a plurality of training fake fingerprint images, and the plurality of training fake fingerprint images may be clustered into different groups based on the extracted histogram. Here, parameters of the overall classifier may be updated based on multi-scale features of a plurality of training fake fingerprint belonging to one of the different groups.

The plurality of training fake fingerprint images may be clustered into the different groups together with a plurality of true fingerprint images. The current layer classifier and the subsequent layer classifier may be combined based on difficulty levels of liveness determination of different groups to form the overall classifier. The difficulty levels of liveness determination may each be determined based on a proportion of the number of training true fingerprint images to the number of training fake fingerprint images belonging to each of the different groups. The current layer classifier may be trained using a group of a first difficulty level, and the subsequent layer classifier may be trained using a group of a second difficulty level. Here, the first difficulty level may be lower than the second difficulty level. The current layer classifier into which the input fingerprint image is input earlier than the subsequent layer classifier may be trained based on training data with a lower difficulty level than that of the subsequent layer classifier.

In operation 505, the liveness determining apparatus 110 may input the feature into the subsequent layer classifier, if an output of the current layer classifier is live. The liveness determining apparatus 110 may determine a liveness of the input fingerprint image to be false if the output of the current layer classifier or an output of the subsequent layer classifier is fake.

In operation 507, the liveness determining apparatus 110 may determine the liveness of the input fingerprint image to be false if the output of the subsequent layer classifier is fake. The liveness determining apparatus 110 may determine whether the input fingerprint image is fake through a plurality of layer classifiers, and determine the input fingerprint image to be true only when all the layer classifiers determine the input fingerprint image to be live.

Figure 6:
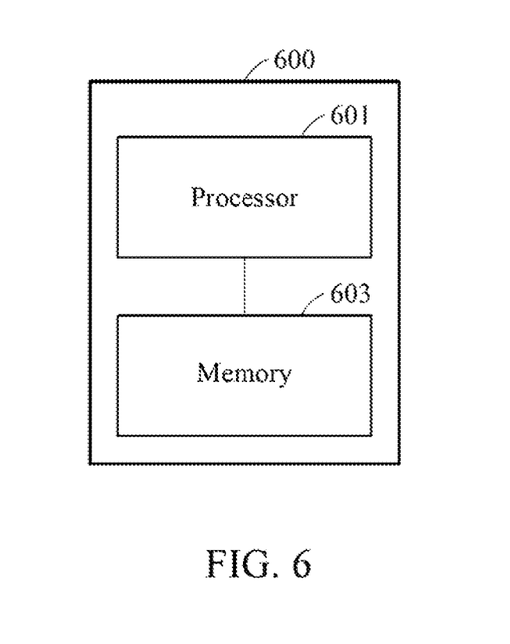
FIG. 6 illustrates a structure of a training apparatus according to an exemplary embodiment.

FIG. 6 illustrates a structure of a training apparatus according to an exemplary embodiment.

A training apparatus 600 may include an overall classifier. The training apparatus 600 may include at least one processor 601 and a memory 603. The memory 603 may store a plurality of training fake fingerprint images.

The processor 601 may cluster the plurality of training fake fingerprint images into a plurality of groups. For example, the training apparatus may cluster the training fake fingerprint images using K-means clustering. The training apparatus may extract a 256-dimensional histogram about intensities of the training fake fingerprint images and perform clustering. For example, the training apparatus may cluster training true fingerprint images together with the plurality of training fake fingerprint images.

The processor 601 may train one or more layer classifiers respectively, using different groups among the plurality of groups. The training apparatus may determine a difficulty level of a group based on training true fingerprint images belonging to the group. For example, the training apparatus may determine the difficulty level based on a proportion of the training true fingerprint images to training fake fingerprint images of the group. The processor 601 may combine the layer classifiers based on the difficulty level. The processor 601 may generate an overall classifier by combining the trained one or more layer classifiers. The memory 603 may store the overall classifier.

Figure 7:
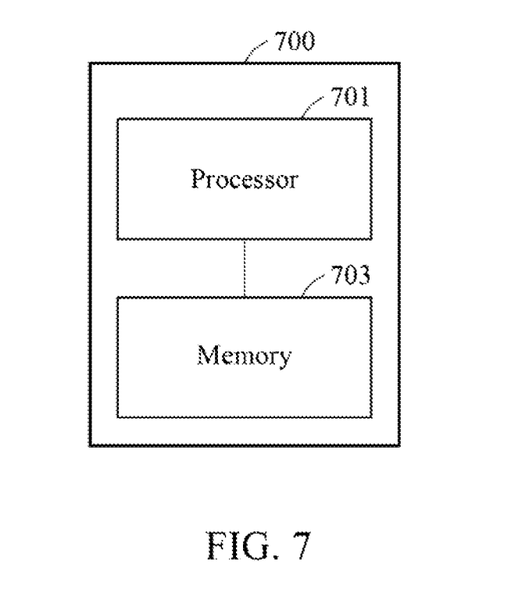
FIG. 7 illustrates a structure of a liveness determining apparatus according to an exemplary embodiment.

FIG. 7 illustrates a structure of a liveness determining apparatus according to an exemplary embodiment.

Referring to FIG. 7, a liveness determining apparatus 700 may include at least one processor 701 and a memory 703. The memory 703 may store an overall classifier including a current layer classifier and a subsequent layer classifier. Here, the current layer classifier and the subsequent layer classifier may refer to a pair of successive layer classifiers, one with a relatively low difficulty level and the other with a relatively high difficulty level, among a plurality of layer classifiers.

The processor 701 may extract a feature from an input fingerprint image. The feature may be a multi-scale feature and include an MLPQ and an MLBP.

The processor 701 may input the feature into the current layer classifier. During a training process, the current layer classifier may be trained using training fake fingerprint images of a first difficulty level, and the subsequent layer classifier may be trained using training fake fingerprint images of a second difficulty level. Here, the first difficulty level may be lower than the second difficulty level. Thus, the current layer classifier may verify an input fingerprint image of a relatively low difficulty level and determine the input fingerprint image is fake if the input fingerprint image is determined to be fake through the feature.

The processor 701 may input the feature into the subsequent layer classifier if an output of the current layer classifier is live. In this example, the processor 701 may verify the feature through the subsequent layer classifier which is more precise than the current layer classifier.

The processor 701 may determine a liveness of the input fingerprint image to be false if an output of the subsequent layer classifier is fake, and determine the input fingerprint image to be fake.

As described above, a higher layer classifier may quickly determine a liveness of an input fingerprint image that may be easily determined, and a lower layer classifier may precisely determine a liveness of an input fingerprint image that may not be easily determined.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents.

What is claimed is:

1. A method of training a liveness determining apparatus, the method comprising:
    clustering, by a processor, a plurality of training fake fingerprint images into a plurality of groups, each of the plurality of groups including one or more training fake finger print images among the plurality of training fake fingerprint images;
    training, by the processor, one or more layer classifiers respectively using different groups among the plurality of groups; and
    generating, by the processor, an overall classifier by combining the trained one or more layer classifiers,
    wherein the generating the overall classifier comprises:
    determining one or more difficulty levels of liveness determination with respect to the plurality of groups; and
    generating the overall classifier by combining the one or more layer classifiers based on the one or more difficulty levels.

2. The method of claim 1, wherein the clustering the plurality of training fake fingerprint images into the plurality of groups comprises:
    extracting an N-dimensional histogram corresponding to intensities of each of the plurality of training fake fingerprint images; and
    clustering the plurality of training fake fingerprint images into the plurality of groups based on the extracted N-dimensional histogram.

3. The method of claim 1, wherein a feature input into the one or more layer classifiers is a multi-scale feature.

4. The method of claim 1, wherein the clustering the plurality of training fake fingerprint images into the plurality of groups comprises clustering a plurality of true fingerprint images together with the plurality of training fake fingerprint images, and the determining comprises determining the difficulty levels each based on a proportion of a number of training true fingerprint images to a number of training fake fingerprint images included in each of the plurality of groups.

5. The method of claim 4, wherein the determining the difficulty levels comprises determining each difficulty level to be relatively high if the proportion is relatively high.

6. The method of claim 1, wherein the generating the overall classifier comprises combining the one or more layer classifiers in an order from a layer classifier of a first difficulty level to a layer classifier of a second difficulty level, the first difficulty level being lower than the second difficulty level.

7. A non-transitory computer-readable storage medium storing instructions that, when executed by a processor, cause the processor to perform the method of claim 1.

8. A liveness determining method using a liveness determining apparatus that includes an overall classifier having a current layer classifier and a subsequent layer classifier, the liveness determining method comprising:

extracting, by a processor, a feature from an input fingerprint image;

inputting, by the processor, the feature into the current layer classifier;

inputting, by the processor, the feature into the subsequent layer classifier based on a determination that an output of the current layer classifier is live; and determining, by the processor, a liveness of the input fingerprint image to be false based on a determination that an output of the subsequent layer classifier is fake, wherein the current layer classifier and the subsequent layer classifier are respectively trained based on a plurality of training fake images belonging to different groups.

9. The liveness determining method of claim 8, further comprising:

determining the liveness of the input fingerprint image to be false, based on a determination that the output of the current layer classifier or the output of the subsequent layer classifier is fake.

10. The liveness determining method of claim 8, further comprising:

extracting an N-dimensional histogram corresponding to intensities of the plurality of training fake fingerprint images, and clustering the plurality of training fake fingerprint images into the different groups based on the extracted N-dimensional histogram.

11. The liveness determining method of claim 8, further comprising:

updating a parameter of the overall classifier based on multi-scale features of a plurality of first training fake fingerprint images belonging to a first group, among the different groups.

12. The liveness determining method of claim 8, further comprising:

clustering the plurality of training fake fingerprint images together with a plurality of true fingerprint images into the different groups, and combining the current layer classifier and the subsequent layer classifier based on a level of difficulty of liveness determination of each of the different groups to form the overall classifier.

13. The liveness determining method of claim 12, wherein the level of difficulty of liveness determination of each of the different groups is determined based on a proportion of a number of training true fingerprint images to a number of training fake fingerprint images belonging to each of the different groups.

14. The liveness determining method of claim 13, wherein the current layer classifier is trained using a first group of training fake images from the plurality of training fake images having a first difficulty level, and the subsequent layer classifier is trained using a second group training fake images from the plurality of training fake images having a second difficulty level, the first difficulty level being lower than the second difficulty level.

15. A liveness determining apparatus, comprising:

a memory configured to store an overall classifier comprising a current layer classifier and a subsequent layer classifier; and at least one processor configured to:

extract a feature from an input fingerprint image, input the feature into the current layer classifier, input the feature into the subsequent layer classifier based on a determination that an output of the current layer classifier is live, and determine a liveness of the input fingerprint image to be false based on a determination that an output of the subsequent layer classifier is fake, wherein the current layer classifier and the subsequent layer classifier are respectively trained based on a plurality of training fake images belonging to different groups.

* * * * *